No. 789,377. PATENTED MAY 9, 1905.
F. J. NEWMAN.
UNSYMMETRICALLY WOUND ELECTRIC MOTOR.
APPLICATION FILED JAN. 9, 1905.
2 SHEETS—SHEET 1.
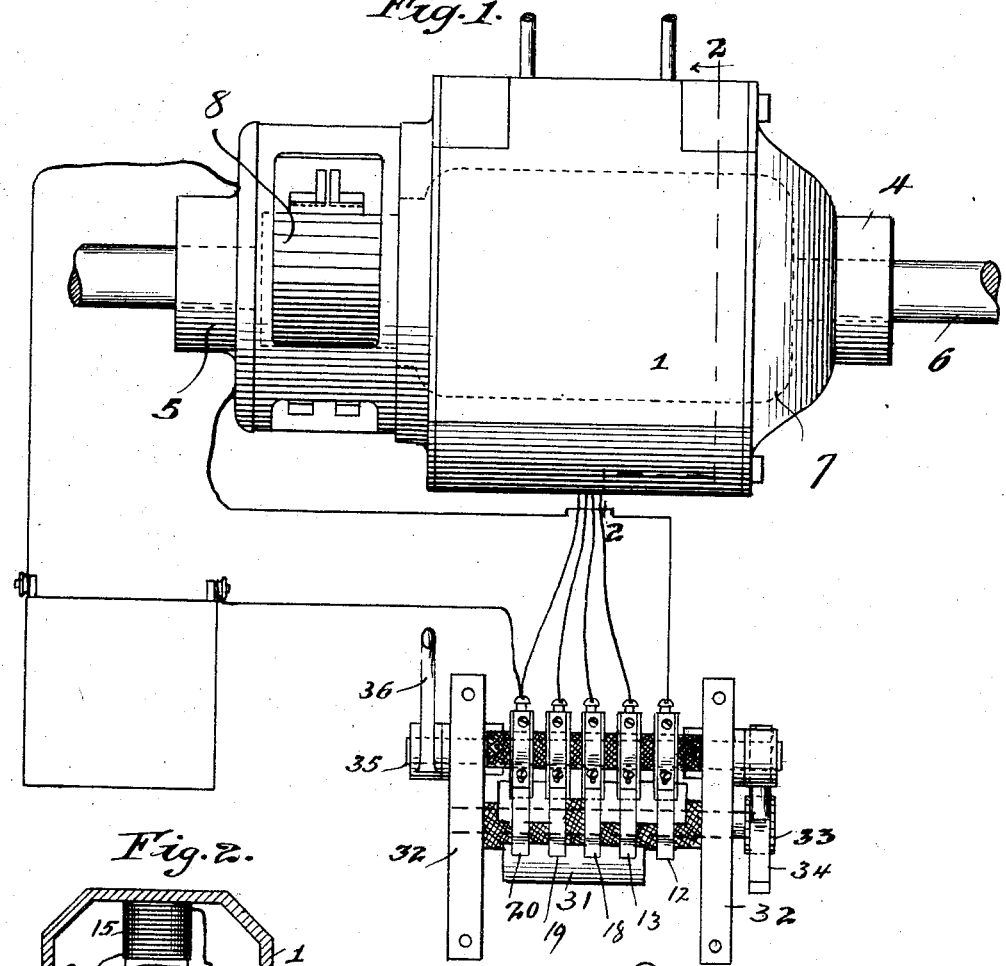
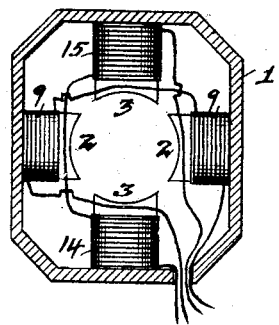
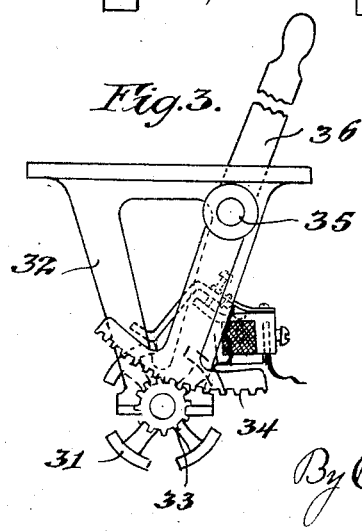

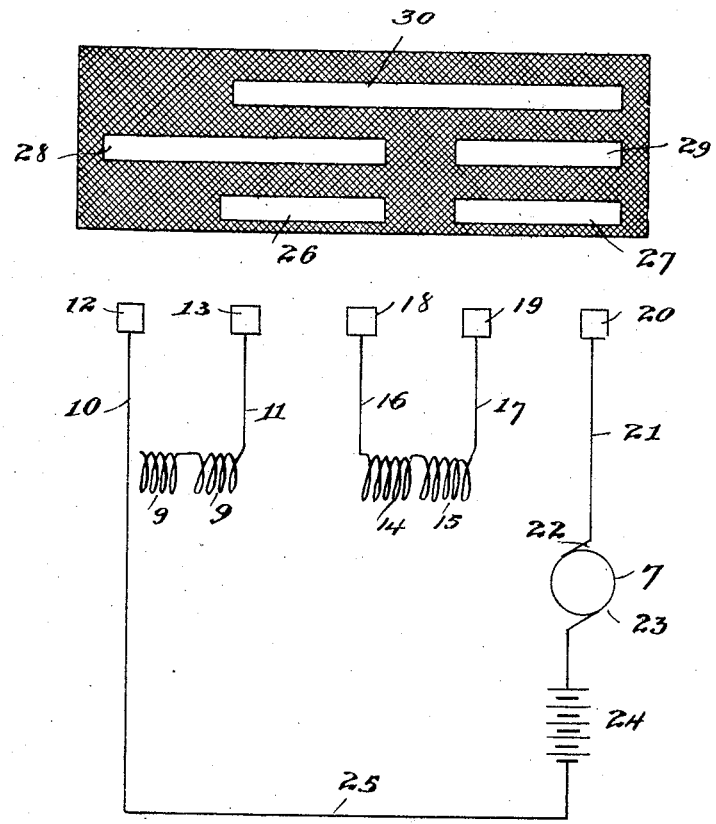

No. 789,377.  Patented May 9, 1905.

UNITED STATES PATENT OFFICE.

FREDERICK J. NEWMAN, OF CHICAGO, ILLINOIS, ASSIGNOR TO WOODS MOTOR VEHICLE COMPANY, OF CHICAGO, ILLINOIS, A CORPORATION OF ILLINOIS.

UNSYMMETRICALLY-WOUND ELECTRIC MOTOR.

SPECIFICATION forming part of Letters Patent No. 789,377, dated May 9, 1905.

Application filed January 9, 1905. Serial No. 240,305.

*To all whom it may concern:*

Be it known that I, FREDERICK J. NEWMAN, a citizen of the United States, residing at Chicago, in the county of Cook and State of Illinois, have invented certain new and useful Improvements in Unsymmetrically-Wound Electric Motors, of which the following is a specification.

This invention relates to improvements in unsymmetrically-wound electric motors; and it has for its salient object to provide a motor by means of which a relatively large variety of speeds may be obtained by a relatively simple arrangement of the field-windings and coöperative switching mechanism for variously controlling said windings.

A secondary object of the invention is to provide a motor of the character referred to characterized by extreme simplicity of mechanism and operation; and a general object is to provide a simple and improved device of the character referred to.

To the above ends the invention consists in the matters hereinafter described, and more particularly pointed out in the appended claims.

The invention will be readily understood from the following description, reference being had to the accompanying drawings, in which—

Figure 1 is a view showing the principal features of the motor in side elevation. Fig. 2 is a cross-sectional view taken on line 2 2 of Fig. 1. Fig. 3 is a detail of the controller or switch whereby the circuits through the motor are controlled. Fig. 4 is a diagrammatic view showing the electrical circuits.

Referring to the drawings, 1 designates the main motor casing or shell, which is externally of a usual form and construction and is provided upon its interior with multipoles or field members 2 2 and 3 3, there being in the present instance four poles arranged in diametrically opposite pairs. The motor-frame is provided with usual bearings 4 and 5 for the main shaft 6, and an armature 7 is mounted upon the main shaft, as usual. The motor is of the direct-current type, and accordingly a commutator mechanism (designated as a whole 8) is provided, it being understood that the general features of the motor are of well-understood construction and require no specific description.

The distinctive feature of the present invention resides in providing an unsymmetrical winding of the field members or pole-pieces, whereby the magnetic intensity may be varied. In the preferred embodiment illustrated herein this is accomplished by making the pole-pieces 3 somewhat longer than the other pair of pole-pieces 2 and placing a larger number of windings upon these longer poles. Of course within reasonable limits the amount of windings upon the several poles might be varied without actually making the pole members longer or otherwise differing from each other, but by simply placing more turns upon one pair than upon the other, or instead of making the pole-pieces longer they might be made of larger circumferential measurement, so that with an equal number of turns upon each pole-piece certain pole-pieces would nevertheless contain a substantially greater amount of winding than certain other pole-pieces. Moreover, while I have herein shown a four-pole motor it will be obvious that the invention is not in any sense limited to that number. I prefer to make and have herein shown the poles of each pair as of equal winding capacity, it being obvious that the torque will be thereby balanced at the opposite sides of the machine.

Referring to diagrammatic view Fig. 4, 9 9 designate the windings of the two-pole pieces 2 2, connected in series with each other and having their terminals 10 and 11, respectively, connected with contact-plates 12 and 13 of a controller. 14 and 15 designate the windings of the pole-pieces 3 3, which have their terminals 16 and 17, respectively, connected with other contact-plates, 18 and 19, of the controller. From a fifth contact-plate 20 of the controller a conductor 21 leads to one of the commutator-brushes, 22, from which the circuit is through the windings of the armature 7 to the other commutator-brush, 23, and from the latter to one pole of the source of power 24. From the opposite pole of the generator a conductor 25 leads to and connects with the conductor 10, so that the windings 9 9 of the field-pieces 2 2 are in shunt relation to the main circuit through the armature. In the diagram the contact-plates of the controller are, for clearness of comprehension, developed in a plain surface. The movable controller member is provided with a series of five contact-plates, (designated, respectively, 26, 27, 28, 29, and 30,) these plates being arranged in three lines corresponding to three working positions of the controller. If the movable member of the controller be shifted laterally to its first working position, the contact-plates 26 and 27 will respectively engage and connect the contact-plates 13 18 and 19 20, in which position all of the windings of the field will be in series, and accordingly the motor will run at its lowest rate of speed. If the movable controller member be shifted to the intermediate working position, the contact 28 will engage the three contacts 12, 13, and 18, while the contact 29 will engage contacts 19 and 20, and in this position it will be obvious that the windings 9 9 will be short-circuited, while the windings 14 14 will be retained in series with the armature. Upon changing the controller to the third position the single contact-plate 30 will engage the contacts 13, 18, 19, and 20, thus short-circuiting the larger coils 14 14 and placing the coils 9 9 in series with the armature. This will of course give the highest rate of speed, while the intermediate position will give the intermediate speed.

In Figs. 1 and 3 I have shown a simple form of controller adapted for effecting the circuit changes as described, said controller comprising a contact-drum (designated as a whole 31) and carrying the several contacts 26 27, &c., arranged in angularly-separated lines extending longitudinally of the drum. The drum 31 is journaled in a suitable frame member 32 and provided at one end with the spur-gear 33, with which meshes a segment 34, pivoted at 35 upon the frame and provided with a handle extension 36, whereby it may be shifted.

I claim as my invention—

1. In a direct-current electric motor provided with a plurality of poles, a series of unequal induction-windings upon said poles, and means for variously connecting said windings to vary the strength of the magnetic field in the poles.

2. In a direct-current electric motor provided with a plurality of poles, a series of induction-windings upon said poles, and means for at will connecting said windings either all in series with the armature, or partly in series and partly in short-circuit connection, for the purpose set forth.

3. In a direct-current electric motor, provided with a plurality of diametrically opposite pairs of poles, a series of unequal induction-windings upon said poles, and means for variously connecting said windings in circuit with the armature, whereby the total strength of the induced magnetic field is varied.

4. A direct-current electric motor comprising an armature or rotor, a field member provided with a plurality of diametrically opposite pairs of poles, a series of windings upon said poles, the inductive capacity of the poles of each pair being substantially equal but the inductive capacity of different pairs being unequal, and means for variously connecting said windings in circuit with the armature, for the purpose set forth.

5. A direct-current electric motor comprising an armature and a field member, the latter provided with a plurality of diametrically opposite pairs of poles, a series of windings upon said poles, the windings of the poles of each pair being of like amount but the windings of different pairs being of unlike amount, and a controller whereby said pole-windings may be connected all in series with the armature, or only partly in series, for the purpose set forth.

6. In a direct-current electric motor the combination of an armature, a four-pole field member having two pairs of poles, the individuals of each pair being arranged in diametrically opposite relation to each other, and the individuals of one pair at right angles to those of the other pair, a series of windings upon said poles, the total windings of one pair being approximately one-half of those of the opposite pair, and a controller for variously connecting said windings in circuit with the armature.

FREDERICK J. NEWMAN.

Witnesses:
FREDERICK C. GOODWIN,
JAMES R. OFFIELD.